(12) United States Patent
Thompson et al.

(10) Patent No.: US 11,342,730 B1
(45) Date of Patent: May 24, 2022

(54) CEILING ENCLOSURE FOR WIRELESS EQUIPMENT

(71) Applicants: Scott Thompson, State Collage, PA (US); Rick Conklin, Bellefonte, PA (US)

(72) Inventors: Scott Thompson, State Collage, PA (US); Rick Conklin, Bellefonte, PA (US)

( * ) Notice: Subject to any disclaimer, the term of this patent is extended or adjusted under 35 U.S.C. 154(b) by 0 days.

(21) Appl. No.: 17/123,276

(22) Filed: Dec. 16, 2020

Related U.S. Application Data

(60) Provisional application No. 62/949,685, filed on Dec. 18, 2019.

(51) Int. Cl.
H02B 1/38 (2006.01)
H01Q 1/12 (2006.01)
H01Q 1/00 (2006.01)
F16M 13/02 (2006.01)

(52) U.S. Cl.
CPC ............ H02B 1/38 (2013.01); F16M 13/027 (2013.01); H01Q 1/007 (2013.01); H01Q 1/1207 (2013.01)

(58) Field of Classification Search
CPC .... H01Q 1/007; H01Q 1/1207; H01Q 1/1221; H02G 3/20; H02G 3/281; H02B 1/38; H02B 1/44; F16M 11/2021; F16M 13/027; H01H 3/162; H05K 5/0226
See application file for complete search history.

(56) References Cited

U.S. PATENT DOCUMENTS

| | | | |
|---|---|---|---|
| 10,608,315 B2 * | 3/2020 | Anolik | H01Q 1/007 |
| 2006/0211451 A1 * | 9/2006 | Pak | H02G 3/123 |
| | | | 455/561 |
| 2014/0265774 A1 * | 9/2014 | Stewart, Jr. | F16M 13/027 |
| | | | 312/246 |
| 2017/0331269 A1 * | 11/2017 | Hansen | A47B 46/005 |

* cited by examiner

Primary Examiner — Andrea Lindgren Baltzell
Assistant Examiner — Amal Patel
(74) Attorney, Agent, or Firm — John J. Elnitski, Jr.

(57) ABSTRACT

A ceiling enclosure that includes a main body, swing down panel and enclosure door. There are pivot ear retention legs extending from the main body. There are latch pin legs extending from the main body. The swing down panel is adapted to mount devices to the swing down panel. The swing down panel includes pivot ears extending from the swing down panel to attach to pivot ear retention legs and includes latch pin retention legs extending from the swing down panel to attach to latch pin legs.

20 Claims, 13 Drawing Sheets

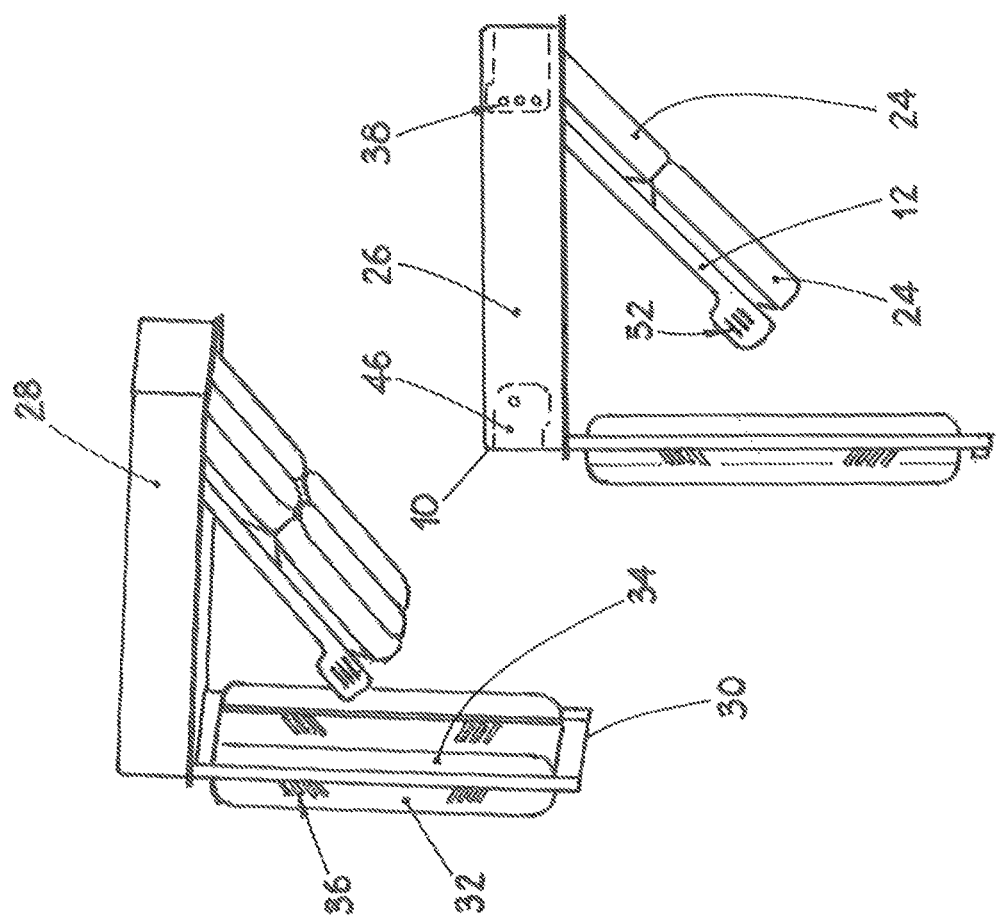
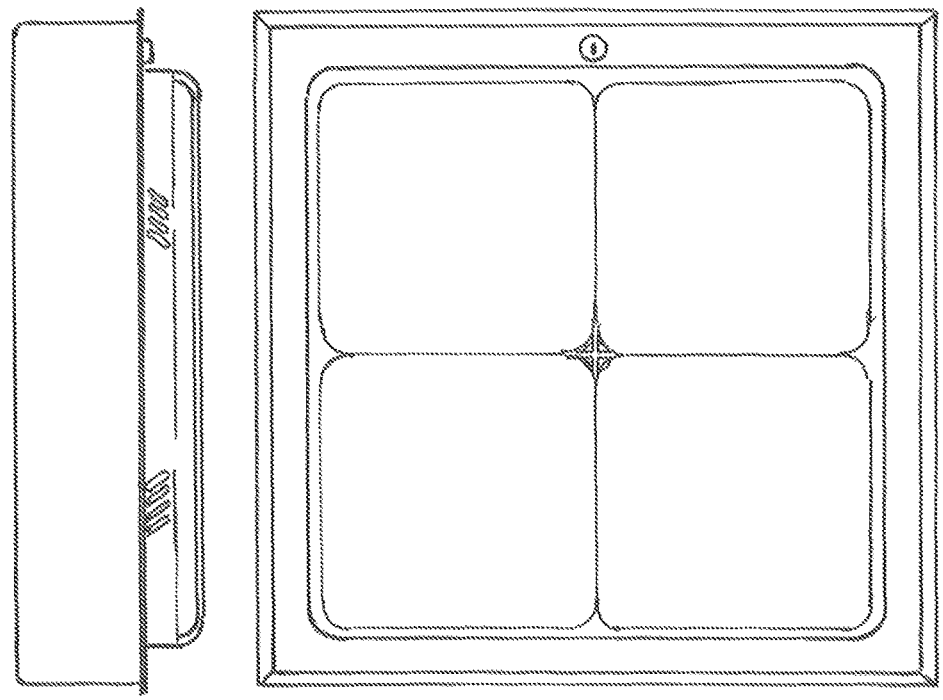
Fig. 1

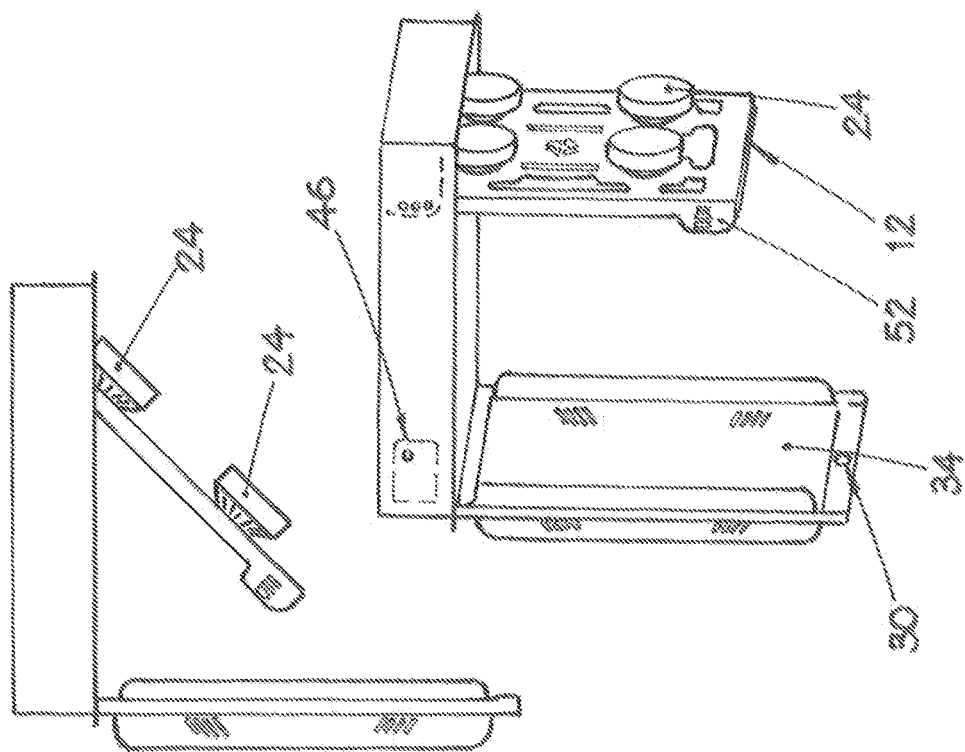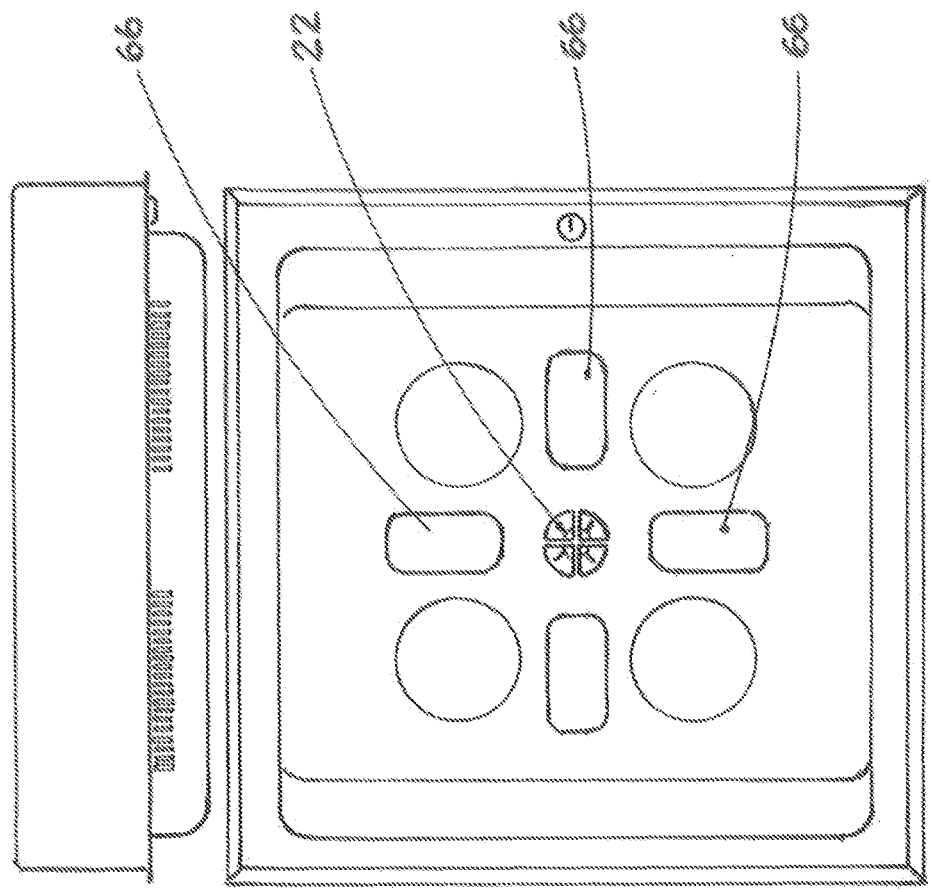
FIG. 2

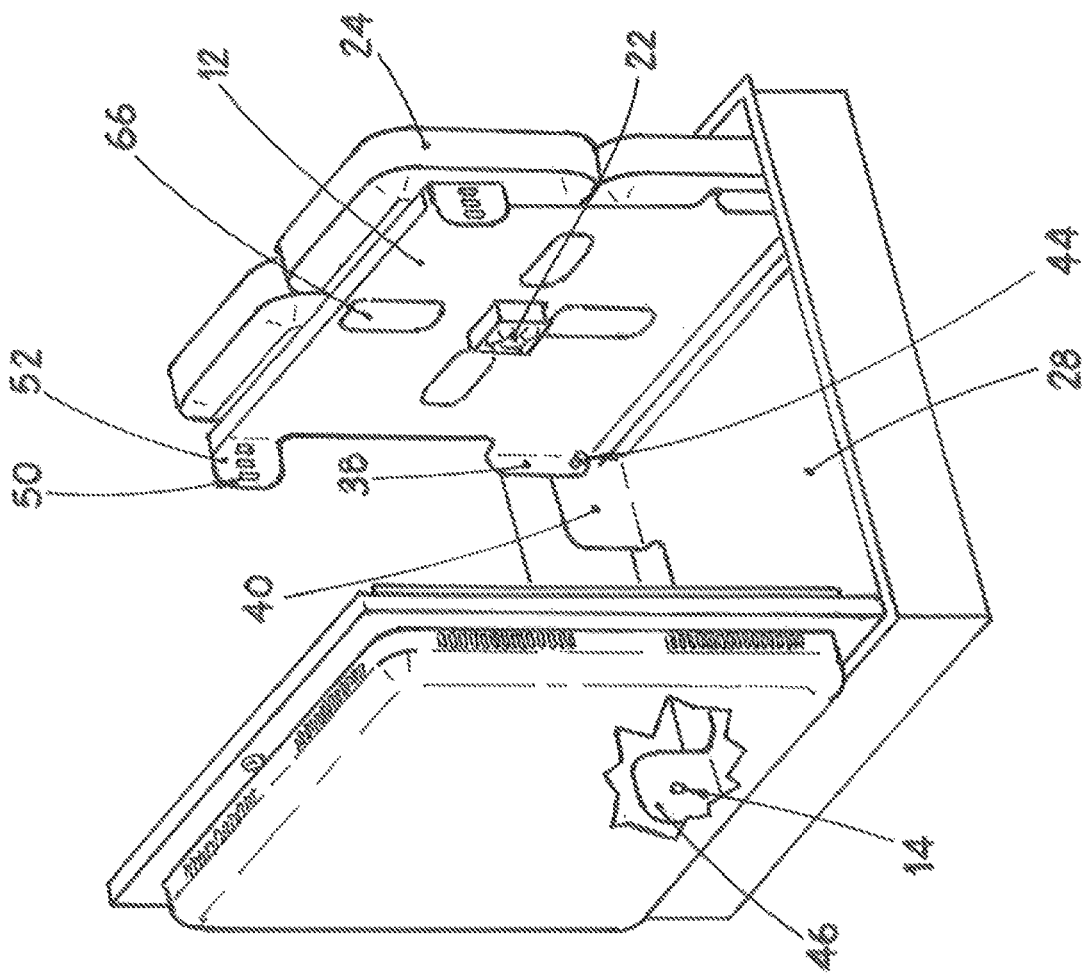
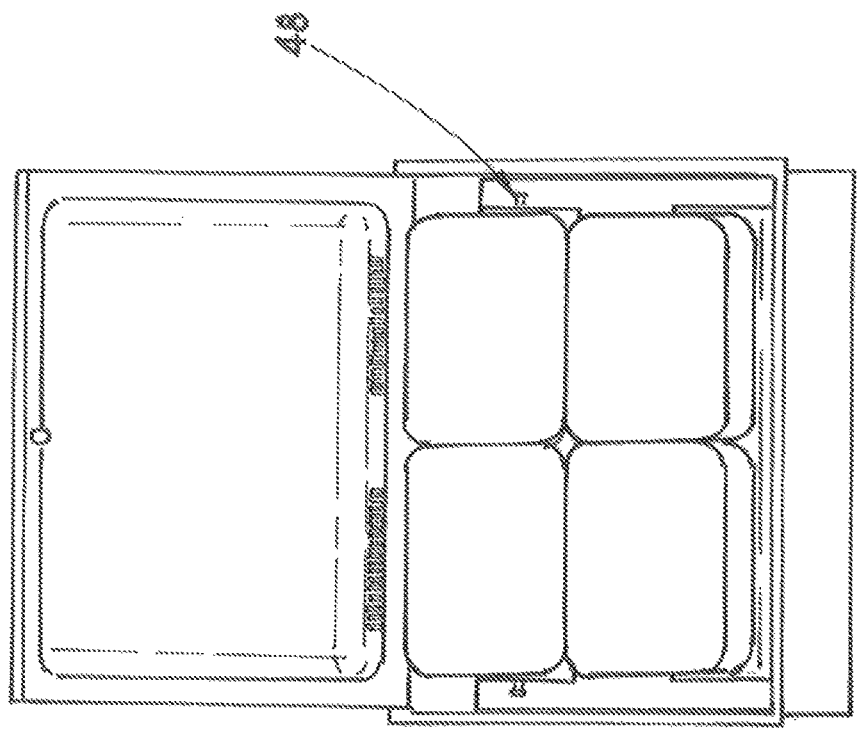
FIG. 4

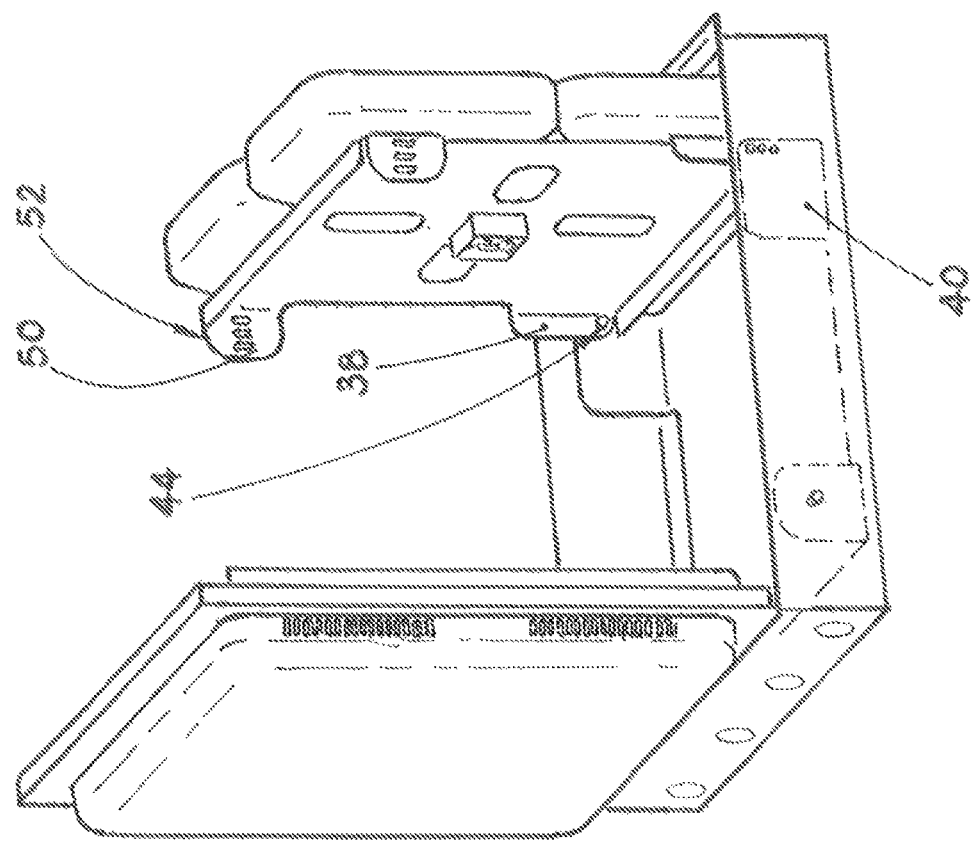
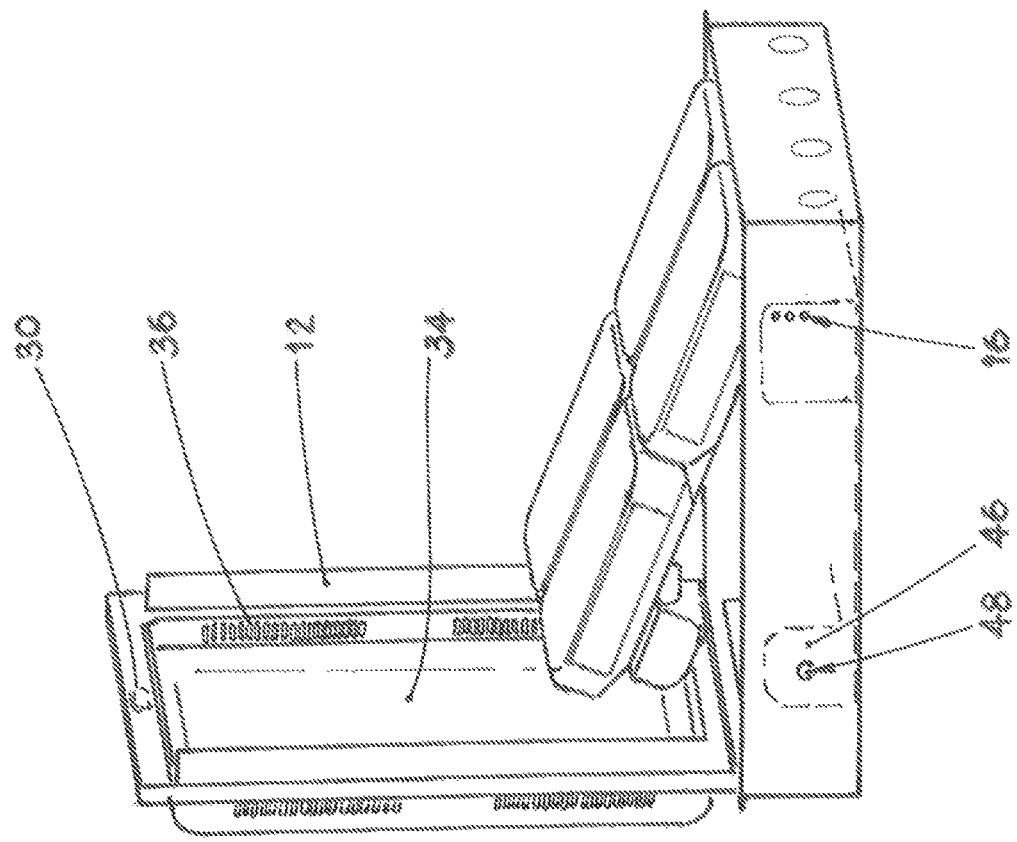
FIG. 5

CEILING ENCLOSURE FOR WIRELESS EQUIPMENT

This application claims the benefit of and incorporates by reference U.S. Provisional Application No. 62/949,685 filed Dec. 18, 2019.

BACKGROUND

The present invention generally relates ceiling enclosures. More specifically, the present invention relates to ceiling enclosures for mounting wireless equipment in a ceiling that includes a swing down service panel.

Wireless networks for internet and cellular systems have become very popular for communication and computer networking in schools, hospitals, factories, public buildings and office buildings. A main part of a wireless networks is an access point. The access point is the unit which communicates wirelessly with mobile devices carried by users. The access point is generally connected to the main network with a data cable and is powered by an external power supply plugged into the access point. Access points are usually mounted in the ceilings of buildings to improve their wireless coverage. Ceilings are used as a way to partially conceal the appearance of the access point and the cables required to interconnect the access point with the network and power. The access point is an expensive piece of equipment which can be easily stolen from the ceiling of a building. Access points can be a variety of shapes and sizes, depending on the manufacturer of the access point. The different shapes and sizes present a problem to universally secure an access point in the ceiling. It is desirable to conveniently mount the access point in the ceiling to conceal much of the access point and connected cables and gives it an overall appearance which is architecturally acceptable.

Likewise, multimedia gateways, such as an Apple TV, are connected to multimedia projectors in classrooms and conference rooms. Ideally the multimedia gateway is mounted physically close to the projector to shorten the cable connected the two. Since the projector is often mounted in the ceiling it is desirable to have the multimedia gateway mounted in the ceiling. This is problematic, as the multimedia gateways are typically not plenum rated to be mounted in or above the ceiling. There is commonly an absence of a convenient means to attach the multimedia gateway to anything structurally. Finally, the multimedia gateway may have a wireless network connection and require an infrared signal to control the operation of the gateway. So the gateway cannot be fully enclosed in metal, but rather must have an opening, so that the gateway can be connected wireless and controlled by IR signals. Other electronic devices may be mounted in the ceiling, including wireless access gear for building automation and asset tracking, real time location systems, ultrasonic transducer, distributed antenna system (DAS) antennas and remote access units, wireless monitoring equipment, video cameras, multimedia projectors, air quality sensors, particle counters, differential pressures sensors, and light and sound sensors.

There are many instances where a wireless designer and installer would like to co-locate multiple small cell or Wi-Fi access points in a single zone enclosure in the ceiling. What is need in the market is a ceiling enclosure that allows the installer to easily install, remove, service and maintain multiple, independent devices such as access points. Also needed is an enclosure that permits the equipment on the inside to be adjusted to a desired depth in the enclosure and to be cooled either by passive convection or active ventilation.

It is an object of the present invention to provide a ceiling enclosure that allows easy install, removal, service and maintenance of multiple, independent access points, while also permitting adjustable depth of installation in the enclosure.

SUMMARY

A ceiling enclosure that includes a main body, swing down panel and enclosure door. There are pivot ear retention legs extending from the main body. There are latch pin legs extending from the main body. The swing down panel is adapted to mount devices to the swing down panel. The swing down panel includes pivot ears extending from the swing down panel to attach to pivot ear retention legs and includes latch pin retention legs extending from the swing down panel to attach to latch pin legs.

BRIEF DESCRIPTION OF DRAWINGS

FIG. 1 are views of a ceiling enclosure according to the present invention.

FIG. 2 are views of a ceiling enclosure according to the present invention.

FIG. 4 are views of a ceiling enclosure according to the present invention.

FIG. 5 are views of a ceiling enclosure according to the present invention.

DETAILED DESCRIPTION OF THE INVENTION

The present invention is a ceiling enclosure for mounting wireless equipment in a ceiling that includes a swing down service panel. This ceiling enclosure allows for simplified installation of multiple Small Cell or Wi-Fi access points in a ceiling mounted zone enclosure. There are many instances where a wireless designer and installer would like to co-locate multiple small cell or Wi-Fi access points in a single zone enclosure in the ceiling. The ceiling enclosure allows the installer to easily install, remove, service and maintain multiple, independent access points. The ceiling enclosure also permits the equipment on the inside to be adjusted to a desired depth in the enclosure and to be cooled either by passive convection or active ventilation.

Figure 3:
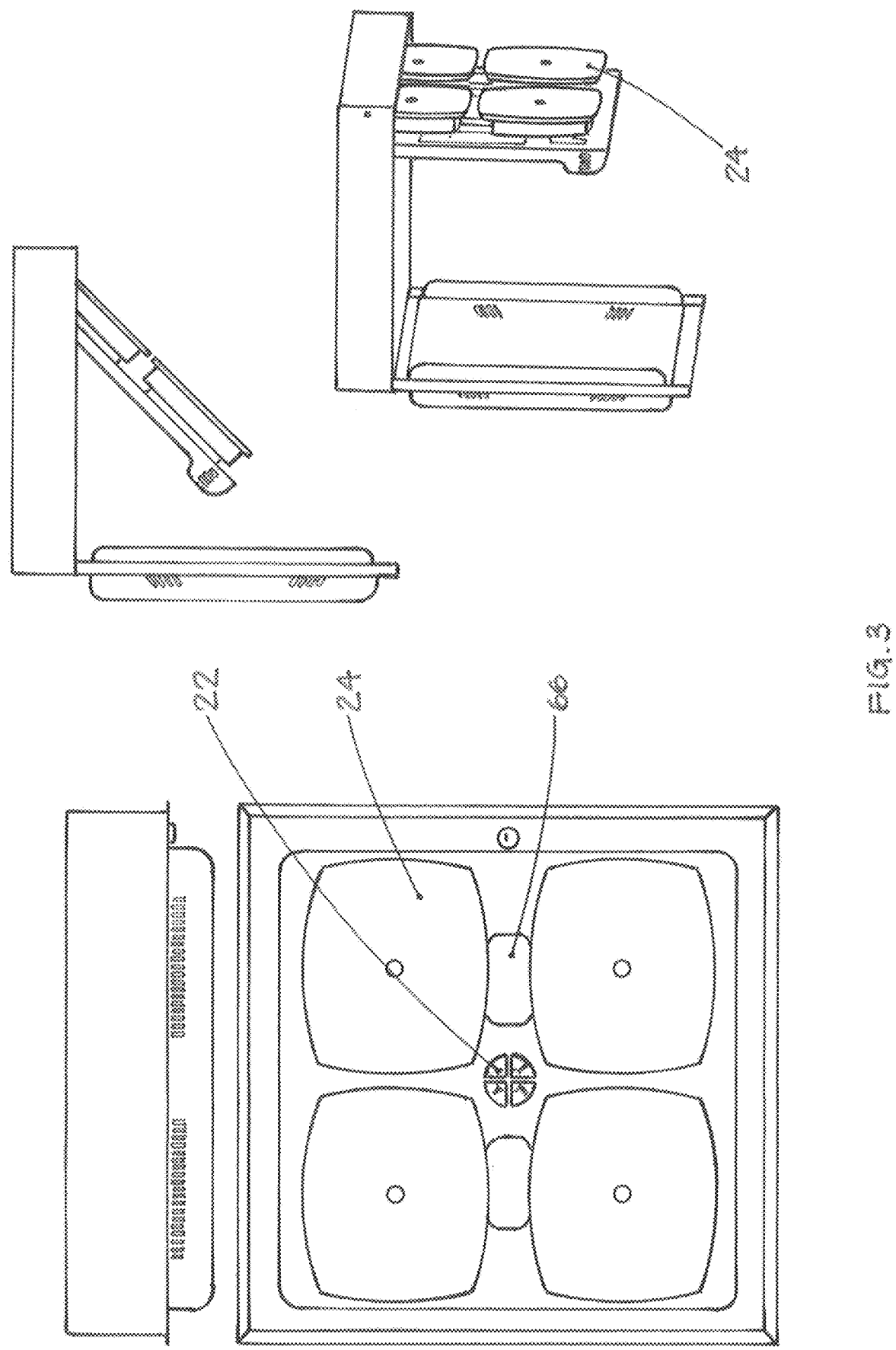
FIG. 3 are views of a ceiling enclosure according to the present invention.

The ceiling enclosure includes a main body 10, a swing down panel 12, spring loaded latch pin 14, spring loaded pivot pin 16, baffles 18, enclosure door 20 and an optional fan 22. FIGS. 1-3 show the ceiling enclosure with three different styles of access points 24 from three different manufacturers installed. The main body 10 is shown with four side walls 26, a back plate 28 and an opening to form an open box. The access points 24 fasten to the swing down panel 12 with screws or other attachment methods. Typically, the enclosure door 20 is hinged to rotate from a side of the main body 10 that is opposite from the side of the main body 10 that swing down panel 12 is hinged to rotate, as shown in FIGS. 1-3. The enclosure door lock 30 is on the side where the swing down panel 12 rotates. The enclosure door 20 is shown in FIGS. 1-3 with a dome 32 that has an enclosed dome area 34 extending from the main body 10 to the inside of the dome 32. The dome area 34 beyond the main body 10 allows for additional room in the ceiling enclosure. The dome area 34 is shown surrounded by holes acting as air vents 36.

FIG. 4 shows two spring loaded latch pins 14 and two spring loaded pivot pins 16, where both are of a spring loaded plunger design. The pivot pins 16 are mounted to pivot ears 38 of the swing down panel 12. The pivot pins 16 rotatably anchor one end of the swing down panel 12 to pivot ear retention legs 40 mounted in the main body 10 of the ceiling enclosure. The pivot ear retention legs 40 each have several holes 42 capture the pivot pin 16 and allow adjustment of the position height of the swing down panel 12 in the ceiling enclosure. The pivot pins 16 permit the swing down panel 12 to swing down for easy service and maintenance of the attached devices. The pivot pins 16 are mounted to the pivot ears 38 of the swing down panel 12 so that the pivot pins 16 extend outward. Due to the plunger design, the pivot pins 16 can be retracted from extending outward from the pivot ears 38 by pulling on the pivot pin head 44 to retract the pivot pin 16. The pivot pin head 44 is released to allow the pivot pin 16 to engage one of the holes 42 on the pivot ear retention leg 40. The pivot ear retention legs 40 are positioned in the main body 10 so that swing door panel 12 is hinged to rotate opposite the enclosure door 20. The pivot pin 16 can be replaced by other fasteners that allow rotation of the pivot ear 38 about the pivot ear retention leg 40, such as a bolt, rod or rivet to rotatably connect the pivot ear 38 to the pivot ear retention leg 40. The latch pins 14 are mounted to latch pin legs 46 mounted in the main body 10 of the ceiling enclosure, so that the latch pins 14 extend inward beyond the latch pin legs 46. Due to the plunger design, the latch pins 14 can be retracted by pulling on the latch pin head 48 so the latch pin 14 does not extend inward from the latch pin legs 46. When released, the latch pins 14 engage holes 50 in latch pin retention legs 52 extending from the swing down panel 12. There needs to be enough room for the hand of the user or a tool in order to pull out on the latch pin head 48. Each latch pin retention leg 52 includes several holes 50 to capture the latch pin 14 and allow adjustment of the position height of the swing down panel 12 in the ceiling enclosure. The latch pins 14 are pulled out to allow the swing down panel 12 to swing down and away from the main body 10 of the ceiling enclosure. The nature of the spring loaded plunger of the latch pin 14 and shape of the end of the latch pin 14 allows for the latch pin 14 to move outward due to contact with latch pin retention leg 52 of the swing down panel 12 when the swing down panel 12 is rotated back into the main body 10 of the ceiling enclosure. The holes 50 of latch pin retention legs 52 capture the latch pins 14 to retain the swing down panel 12 in a shut position with the main body 10 of the ceiling enclosure. The end of the latch pin 14 can be chamfered or rounded.

Figure 6:
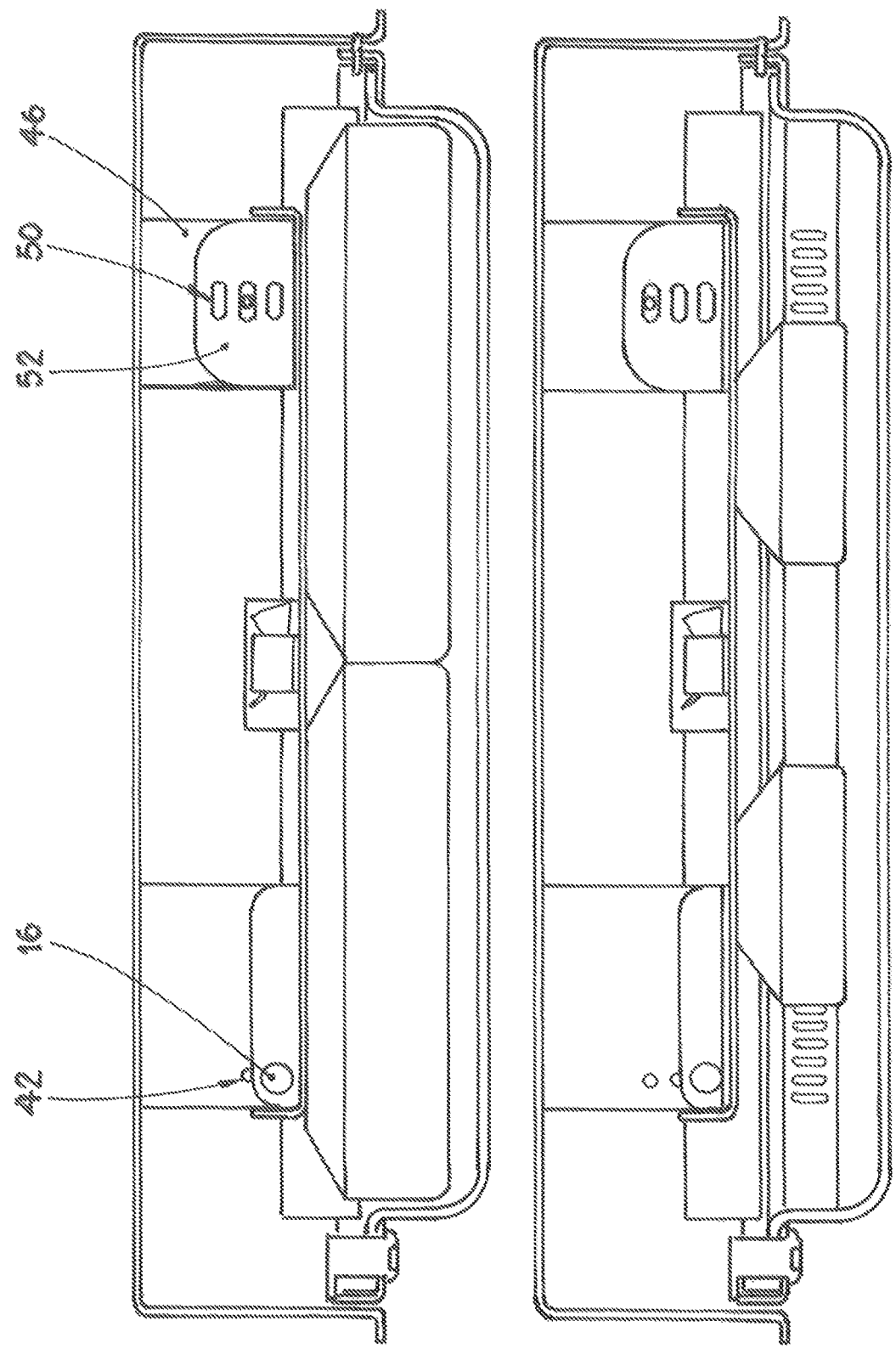
FIG. 6 are views of a ceiling enclosure according to the present invention.

FIGS. 5-6 show how the swing down panel 12 can be adjusted in depth inside the ceiling enclosure. Many of the access points have built in antennas and it is desirable to have the access point antenna placed within the dome area 34 of the dome 32 extending outward from the main body 10 as far as possible. The depth can be adjusted by releasing the latch pins 14, swinging the swing down panel 12 open, then releasing the pivot pins 16, thereby freeing the swing down panel 12 from the ceiling enclosure. The pivot pins 16 can be moved to another level of the holes 42 in the pivot ear retention legs 40. The swing down panel 12 is swung shut so the latch pins 14 engage holes 50 on the latch pin retention legs 52 that are on the same "level" as the pivot pins 14. FIG. 6 shows as an example larger devices mounted in ceiling enclosure A and smaller devices mounted in ceiling enclosure B, necessitating the use of different holes 42, 50 in the pivot ear retention legs 40 and latch pin retention legs 52, in order to project the devices further into the dome area 34.

Figure 7:
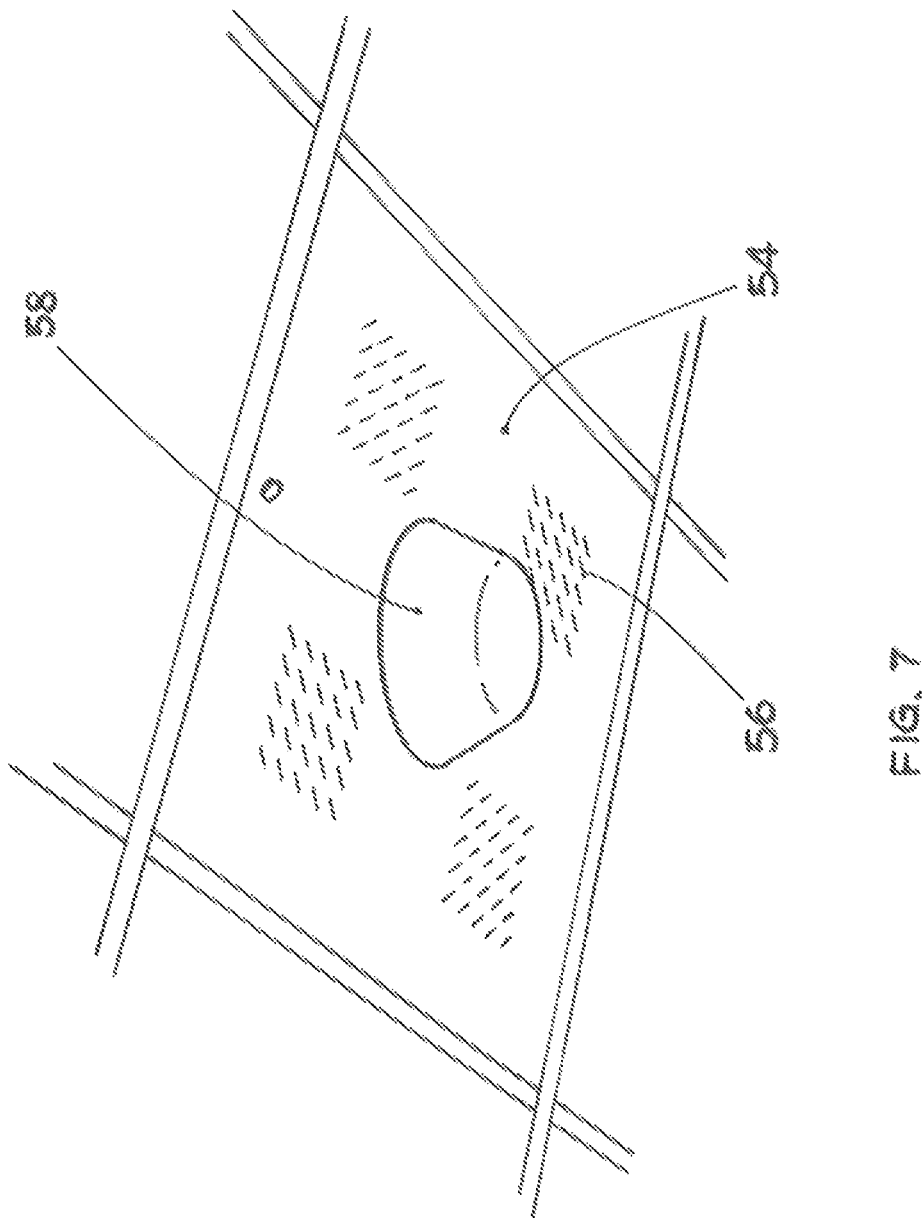
FIG. 7 is a perspective view of a ceiling enclosure according to the present invention.
Figure 8:
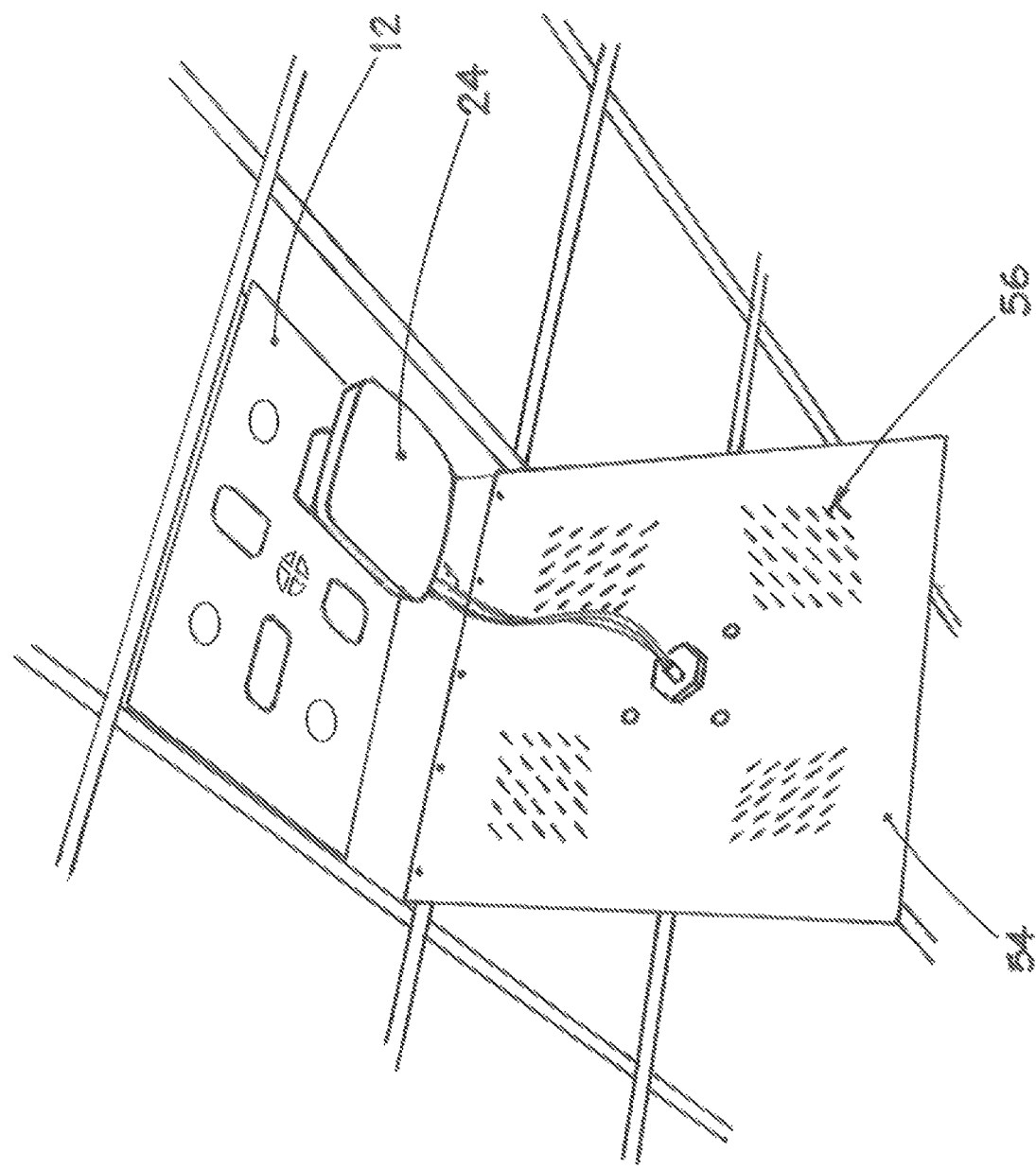
FIG. 8 is a perspective view of a ceiling enclosure according to the present invention.
Figure 9:
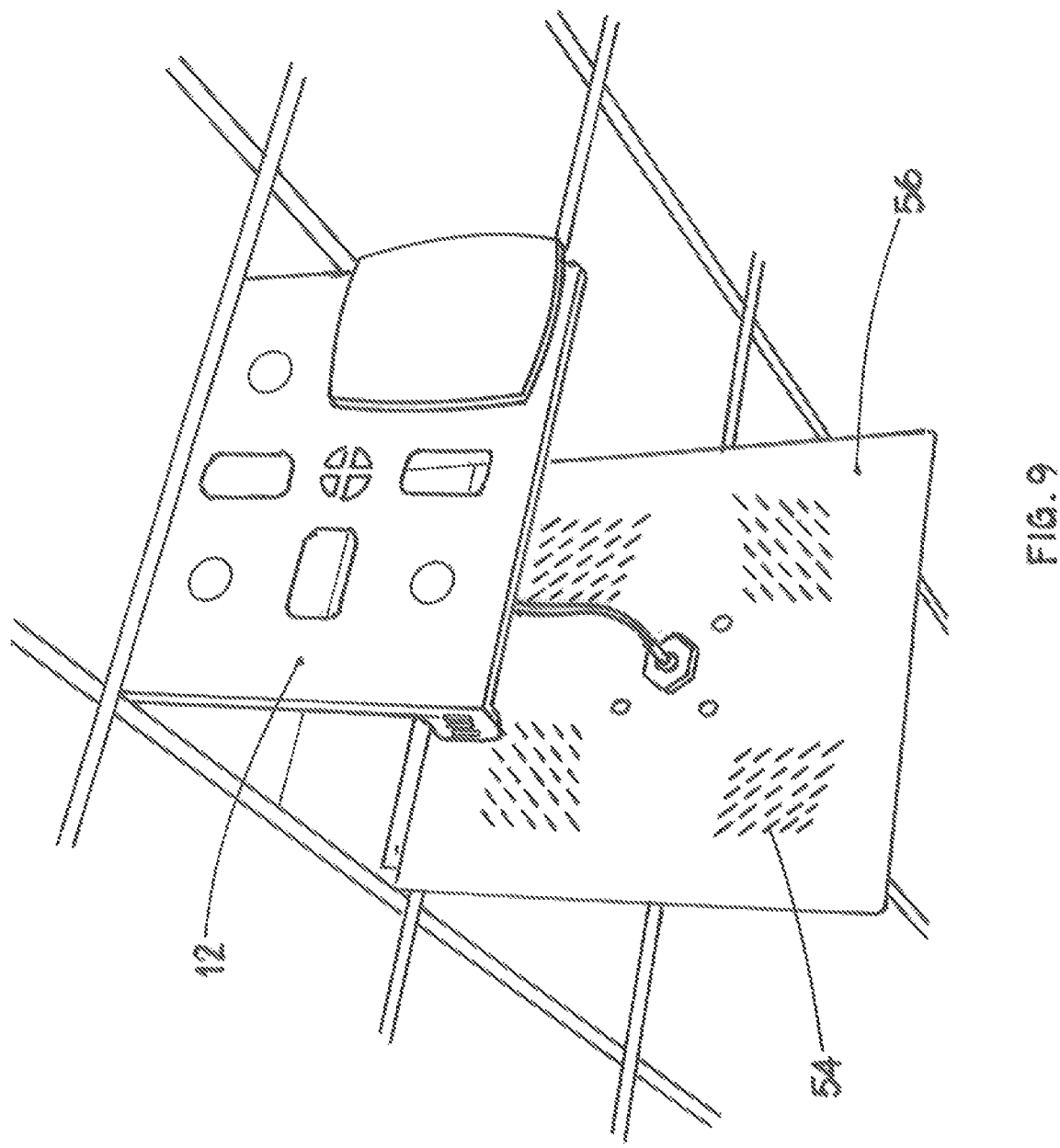
FIG. 9 is a perspective view of a ceiling enclosure according to the present invention.
Figure 10:
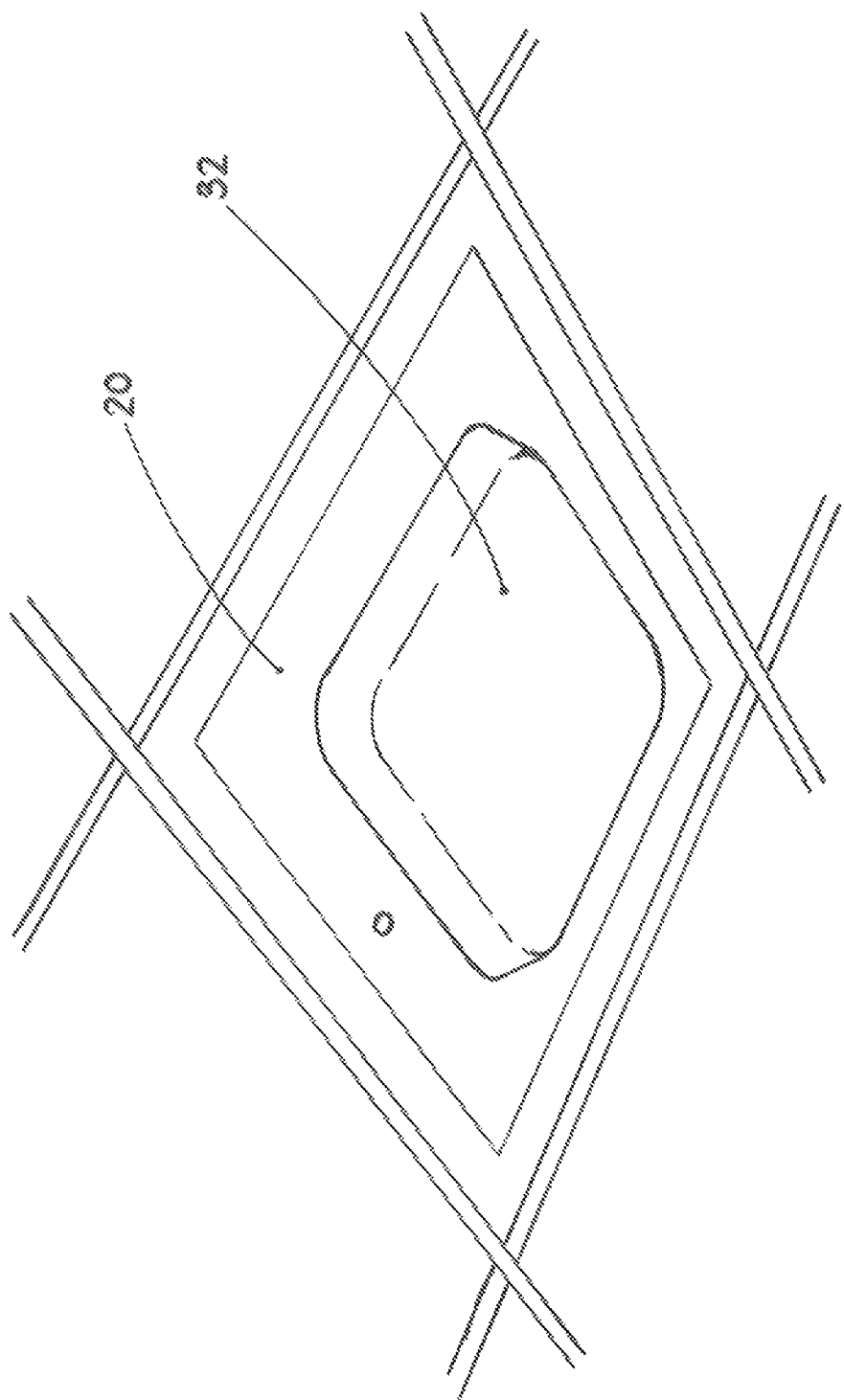
FIG. 10 is a perspective view of a ceiling enclosure according to the present invention.
Figure 11:
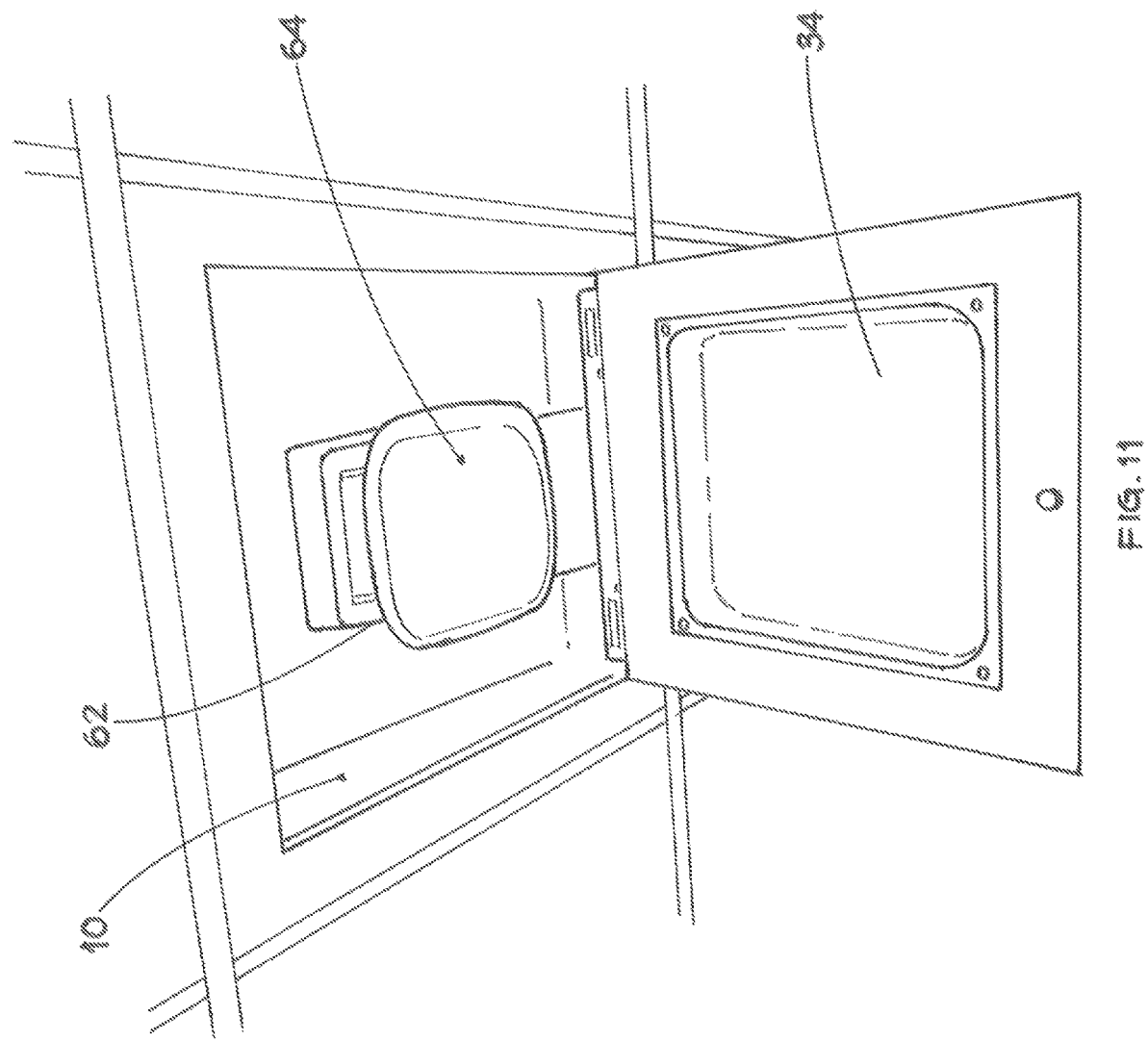
FIG. 11 is a perspective view of a ceiling enclosure according to the present invention.
Figure 12:
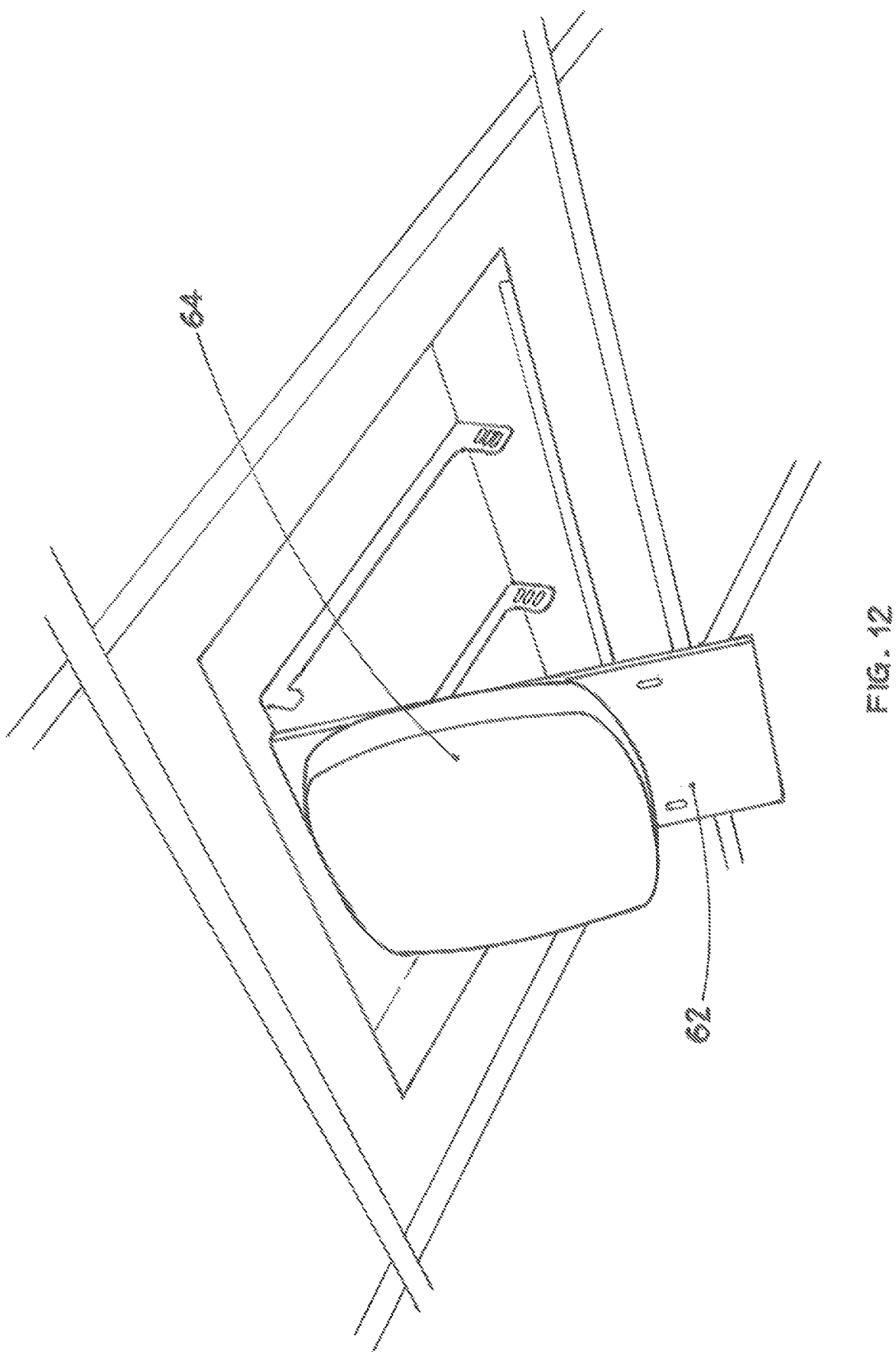
FIG. 12 is a perspective view of a ceiling enclosure according to the present invention.

FIGS. 7-9 show the ceiling enclosure with a flush door 54 without a dome in a ceiling tile system used in a ceiling. The door 54 is shown with ventilation holes 56. The door 54 replaces the enclosure door 20 with a dome 32 for use with access points which have connectors for external antennas. An external antenna 58 is mounted on the door 54 and cables travel from the door 54 to connect to the access points mounted on the swing down panel 12. FIG. 7 shows the door 54 in a closed position. FIG. 8 shows the door 54 in an opened position. FIG. 9 shows the door 54 in an opened position and the swing down panel 12 lowered. FIGS. 10-12 show an embodiment of the ceiling enclosure with a domed enclosure door 20 and a single device 60. FIG. 10 shows enclosure door 20 in a closed position. FIG. 11 shows the enclosure door 20 in an open position. FIG. 12 shows a swing down panel 62 of a smaller size lowered for convenient attachment of cables, and the depth can be adjusted for easy closure of the enclosure door 20. The swing down panel 62 in FIGS. 11-12 is shown as a smaller panel just large enough for a single device 64. The device 64 is mounted such that when swing down panel 62 is open, the device 64 is kept in place by gravity, if the device 64 is mounted using posts on the device 64 and slots on the swing down panel 62 without the need of locking down the device 64 to the swing down panel 62. This type of gravity mount of devices on the swing down panel can be used with all embodiments of the ceiling enclosure.

Figure 13:
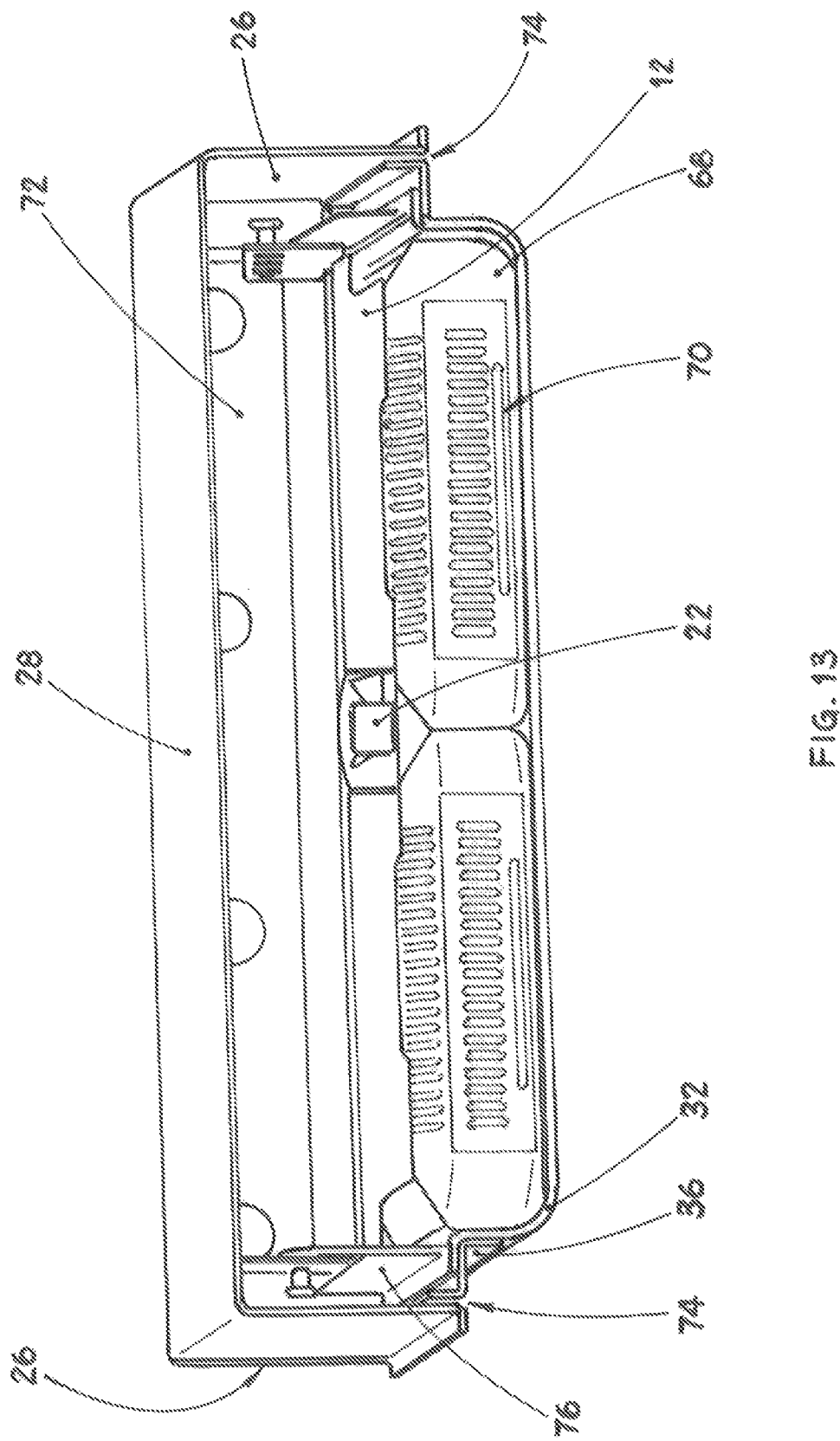
FIG. 13 is a cut-away view of a ceiling enclosure according to the present invention.

For passive cooling, the swing down panel 12 can include openings 66 about the surface of the swing down panel 12, as shown in FIGS. 2-5. With passive cooling, air passes freely through the vents 36 of the enclosure door 20 and through the area between the enclosure door 20 and the swing down panel 12 shown as the front chamber 68. The air travels past the devices 70 and the swing down panel 12 and through the openings 66 of the swing down panel 12 on into the area between the swing down panel 12 and the inside walls 26 of the main body 10 shown as the rear chamber 72, whereby the air is cooled by contact with the main body walls 26, as shown in FIG. 13. Also shown in FIG. 13 is an optional active fan 22 placed in an opening 66 of the swing down panel 12. When the fan 22 is on, air is pulled in through ventilation slots 36 in the enclosure door 20 or in the dome 32 and into the front chamber 68. The air travels past the devices 70, through the fan 22 and into the rear chamber 72, whereby the air is the pushed through gaps 74 between the enclosure door 20 and the main body 10. The gaps 74 between the enclosure door 20 and the main body 12 can be designed to optimize the movement of air to the gaps 74. Baffles 76 can be installed that create the "front" and "rear" chambers to help improve airflow past the devices 70 mounted to the swing down panel 12. It is desired not to have ventilation openings in the back box that is the main body 10, as the back box may serve as a barrier in a fire rated ceiling. Therefore, there is the use of ventilation openings 36 in the enclosure door 20 or dome 32, and exit air gaps 74 between the perimeter of the enclosure door 20 and the ceiling enclosure, to permit ventilation circulation, without openings in the back box.

While different embodiments of the invention have been described in detail herein, it will be appreciated by those skilled in the art that various modifications and alternatives to the embodiments could be developed in light of the overall teachings of the disclosure. Accordingly, the particular arrangements are illustrative only and are not limiting as to the scope of the invention that is to be given the full breadth of any and all equivalents thereof.

We claim:

1. A ceiling enclosure comprising:
   a main body in a shape of an open box adapted to be mounted in a ceiling;
   at least one pivot ear retention leg extending from said main body, said pivot ear retention leg including at least one pin hole;
   at least one latch pin leg extending from said main body, said latch pin leg including a spring loaded plunger pin mounted to said latch pin leg;
   a swing down panel adapted to mount electronic devices to said swing down panel, said swing down panel including at least one pivot ear extending from said swing down panel to attach to said at least one pivot ear retention leg, said pivot pin ear including a fastener to rotatably connect said pivot ear to said pivot ear retention leg, said swing down panel including at least one latch pin retention leg extending from the swing down panel to attach to said at least one latch pin leg, said latch pin retention leg including at least one pin hole to engage said pin of said latch pin leg; and
   an enclosure door hinged to said main body, said enclosure door hinged to close off opening of said main body to enclose said swing down panel and the devices within said main body.

2. The ceiling enclosure of claim 1, wherein said main body includes four sides and a back plate.

3. The ceiling enclosure of claim 2, wherein said main body is fire rated to be mounted in a ceiling.

4. The ceiling enclosure of claim 1, wherein said enclosure door includes ventilation holes.

5. The ceiling enclosure of claim 4, wherein said swing down panel includes openings to allow air to pass from said ventilation holes.

6. The ceiling enclosure of claim 5, further including air gaps between said enclosure door and said main body to allow air to exit said ceiling enclosure.

7. The ceiling enclosure of claim 6, further including baffles to create chambers to improve airflow past the devices mounted to said swing down panel.

8. The ceiling enclosure of claim 5, further including a fan to pull air in said main body through said ventilation holes.

9. The ceiling enclosure of claim 8, further including air gaps between said enclosure door and said main body to allow air to exit said ceiling enclosure.

10. The ceiling enclosure of claim 1, wherein said enclosure door includes a dome extending beyond said enclosure door with a dome area adapted to allow room for the devices.

11. The ceiling enclosure of claim 10, wherein said dome includes ventilation holes.

12. The ceiling enclosure of claim 11, wherein said swing down panel includes openings to allow air to pass from said ventilation holes.

13. The ceiling enclosure of claim 12, further including air gaps between said enclosure door and said main body to allow air to exit said ceiling enclosure.

14. The ceiling enclosure of claim 13, further including baffles to create chambers to improve airflow past the devices mounted to said swing down panel.

15. The ceiling enclosure of claim 12, further including a fan to pull air in said main body through said ventilation holes.

16. The ceiling enclosure of claim 15, further including air gaps between said enclosure door and said main body to allow air to exit said ceiling enclosure.

17. The ceiling enclosure of claim 1, wherein said at least one pivot ear retention leg and said at least one latch pin retention leg each include multiple pin holes to adjust the positon of the swing down panel in the main body.

18. The ceiling enclosure of claim 1, wherein there is two pivot pin ears, two pivot ear retention legs, two latch pin retention legs and two latch pin legs.

19. The ceiling enclosure of claim 18, wherein said pivot ear retention legs and said latch pin retention legs each include multiple pin holes to adjust the positon of the swing down panel in the main body.

20. The ceiling enclosure of claim 18, wherein said fastener of said pivot pin ear to engage said pivot ear retention leg is a spring loaded plunger pin mounted to said pivot pin ear.

* * * * *